(No Model.)
E. T. BURROWES.
INSECT DESTROYER.
No. 552,703. Patented Jan. 7, 1896.
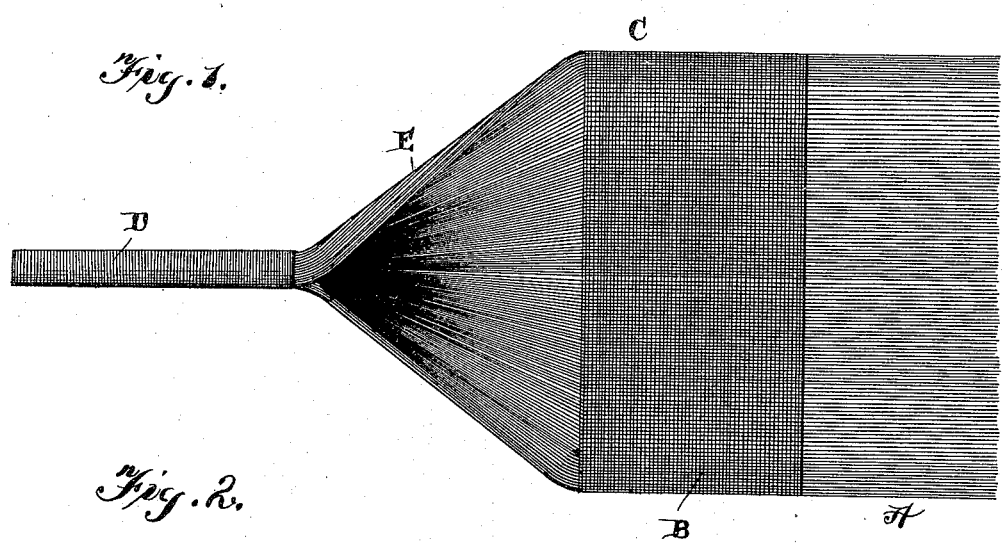
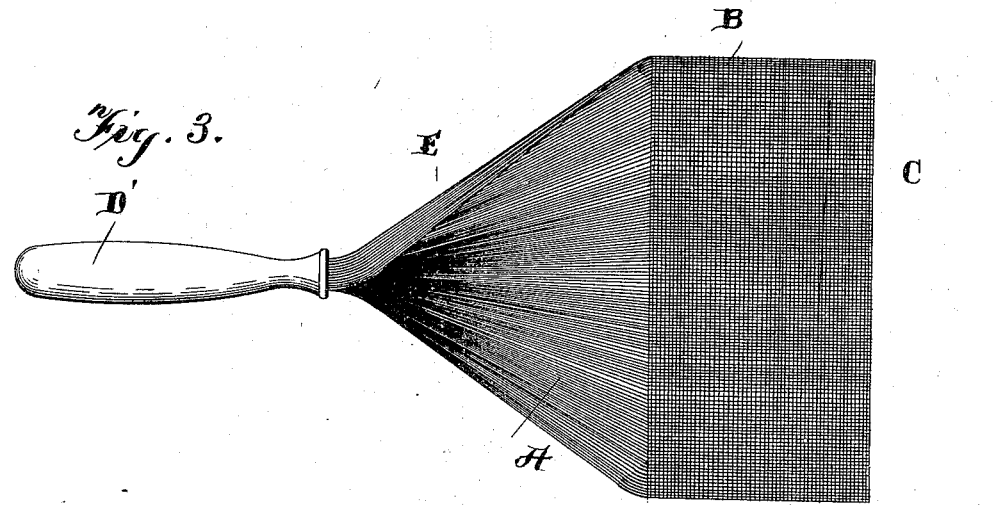
Witnesses
Geo. E. Frech
G. A. Pennington
Inventor
Edward T. Burrowes
by L. S. Bacon
Attorney

UNITED STATES PATENT OFFICE.

EDWARD T. BURROWES, OF PORTLAND, MAINE.

INSECT-DESTROYER.

SPECIFICATION forming part of Letters Patent No. 552,703, dated January 7, 1896.

Application filed August 13, 1895. Serial No. 559,183. (No model.)

*To all whom it may concern:*

Be it known that I, EDWARD T. BURROWES, a citizen of the United States, residing at Portland, in the county of Cumberland and State of Maine, have invented certain new and useful Improvements in Insect-Destroyers; and I do hereby declare the following to be a full, clear, and exact description of the invention, such as will enable others skilled in the art to which it appertains to make and use the same.

This invention relates to an improvement in insect-destroyers; and it is embodied in the construction illustrated in the accompanying drawings and hereinafter described.

The invention consists in a peculiarly-formed metal brush of the class known as "fly" or "insect" destroyers; and the object of the invention is to provide a brush having a flexible section at a point back from the striking-section, and also to provide a striking-section which will permit the passage of air therethrough and present an extended flat striking-surface incapable of spreading or separating.

A further object is to provide a brush with a permanent flat section and extended free ends, and, further, to provide a light, inexpensive and durable device of the nature indicated.

While I intend the brush to be used as an insect-destroyer, I wish it understood that it may be employed for other purposes—as, for instance, by dispensing with the free ends the same may be used advantageously for a duster or beater.

The invention is illustrated in the accompanying drawings, wherein like letters of reference designate corresponding parts in the several views, and in which—

Figure 1 represents in elevation the invention in its preferred form. Fig. 2 is an edge view. Fig. 3 is a modified form.

In the drawings the destroyer is represented as consisting of a brush-head composed of the longitudinal steel wires A, closely arranged, and at a point intermediate their ends they are connected by the cross-wires B, interwoven therewith, and forming the woof of a wire-netting C, the longitudinal wires forming the warp. This netted section extends across the entire brush and constitutes what I term the "striking-section," which, briefly stated, consists of a flat-wire netting.

The outer ends of the wires A are free, constituting flexible fingers, and serve to kill or destroy the insects when struck while on or near irregular surfaces, such as near the bars of windows or screens.

The opposite ends of the wires A are gathered and united in any suitable manner, preferably by winding them spirally and binding them together by braiding or twisting to form the handle or handle-section D, which may be covered by any suitable material.

The space E between the handle and netting is composed wholly of the wires A, and thereby forms a very elastic or flexible section, so that a switching action or movement may be given the netted section.

In Fig. 3 I have shown a modified form of brush, wherein the free ends are omitted and a handle D' formed of wood, the gathered ends of the handle-section of the wires A being secured in a suitable bore formed in the end of the wooden handle.

By the construction above described it will be seen that a brush is formed of but a single thickness of material, as dintinguished from a collected series of bunches.

The effect of the construction is that a very light device is formed, offering but slight resistance to the air and presenting an extended striking-section, which will effectively destroy the insect when the latter is struck thereby. The woven section prevents the wires from separating and forms a permanent flat striking-section, which retains its shape irrespective of the force used in handling.

I desire it understood that I do not limit myself to the form of brush shown and described, as many variations and changes can be made therein without in the least departing from the nature and principle of the invention.

Having thus described the invention, what is claimed as new, and desired to be secured by Letters Patent, is—

An insect-destroying brush consisting of a brush head having its outer section formed of a wire netting and constituting the striking portion, its intermediate section formed of continuations of the warp wires of the netting, gathered at their inner ends, extending beyond the woof wires, and secured together, and a handle section, substantially as and for the purposes set forth.

In testimony whereof I affix my signature in presence of two witnesses.

EDWARD T. BURROWES.

Witnesses:
    CHARLES DAY,
    WARREN W. COLE.